May 3, 1932.  L. TADDEO  1,856,670
EQUALIZING DEVICE FOR BRAKES
Filed July 30, 1929  2 Sheets-Sheet 1
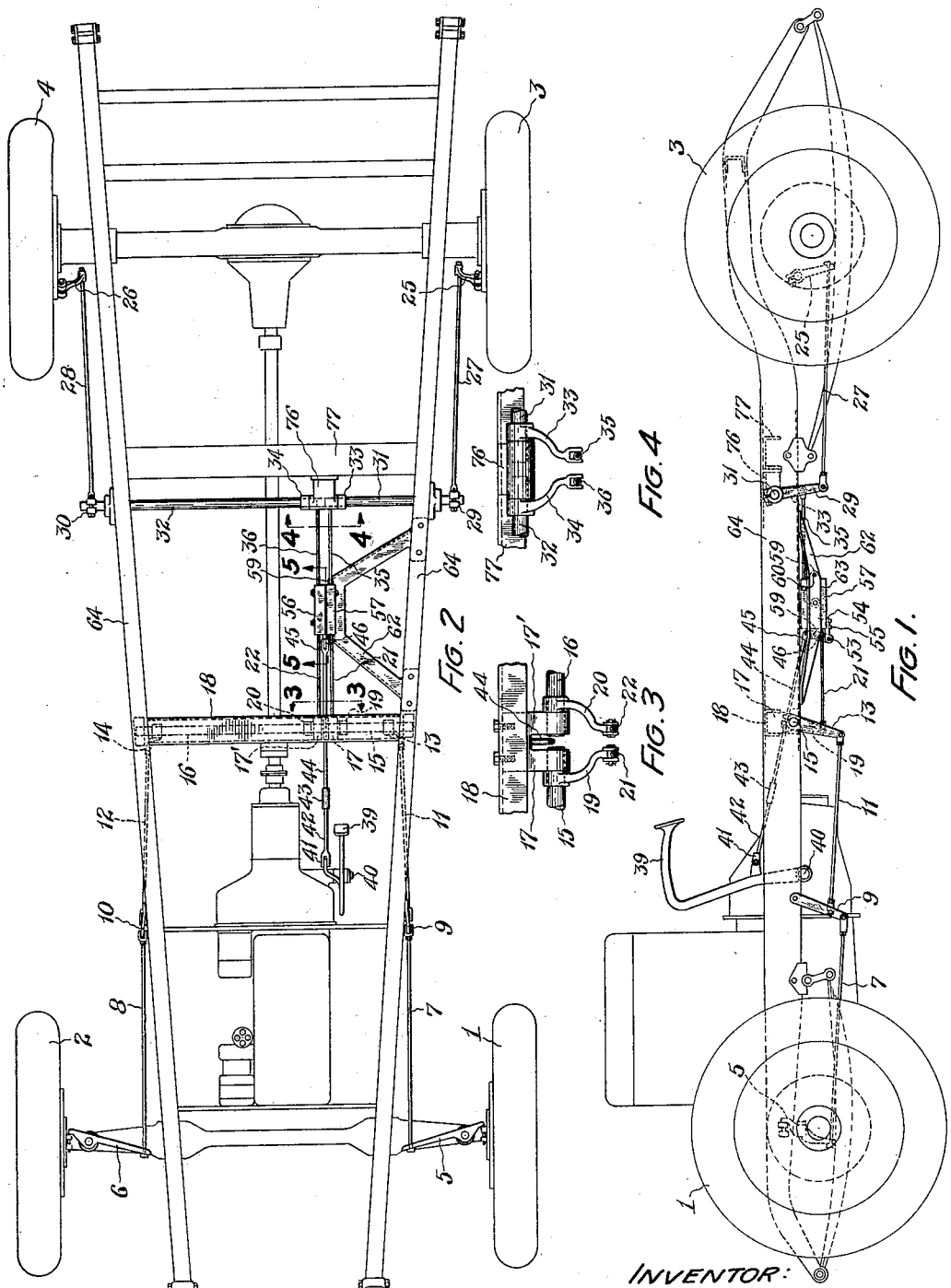
INVENTOR:
LUIGI TADDEO
BY
George W. Saywell
ATTORNEY.

May 3, 1932.  L. TADDEO  1,856,670
EQUALIZING DEVICE FOR BRAKES
Filed July 30, 1929  2 Sheets-Sheet 2
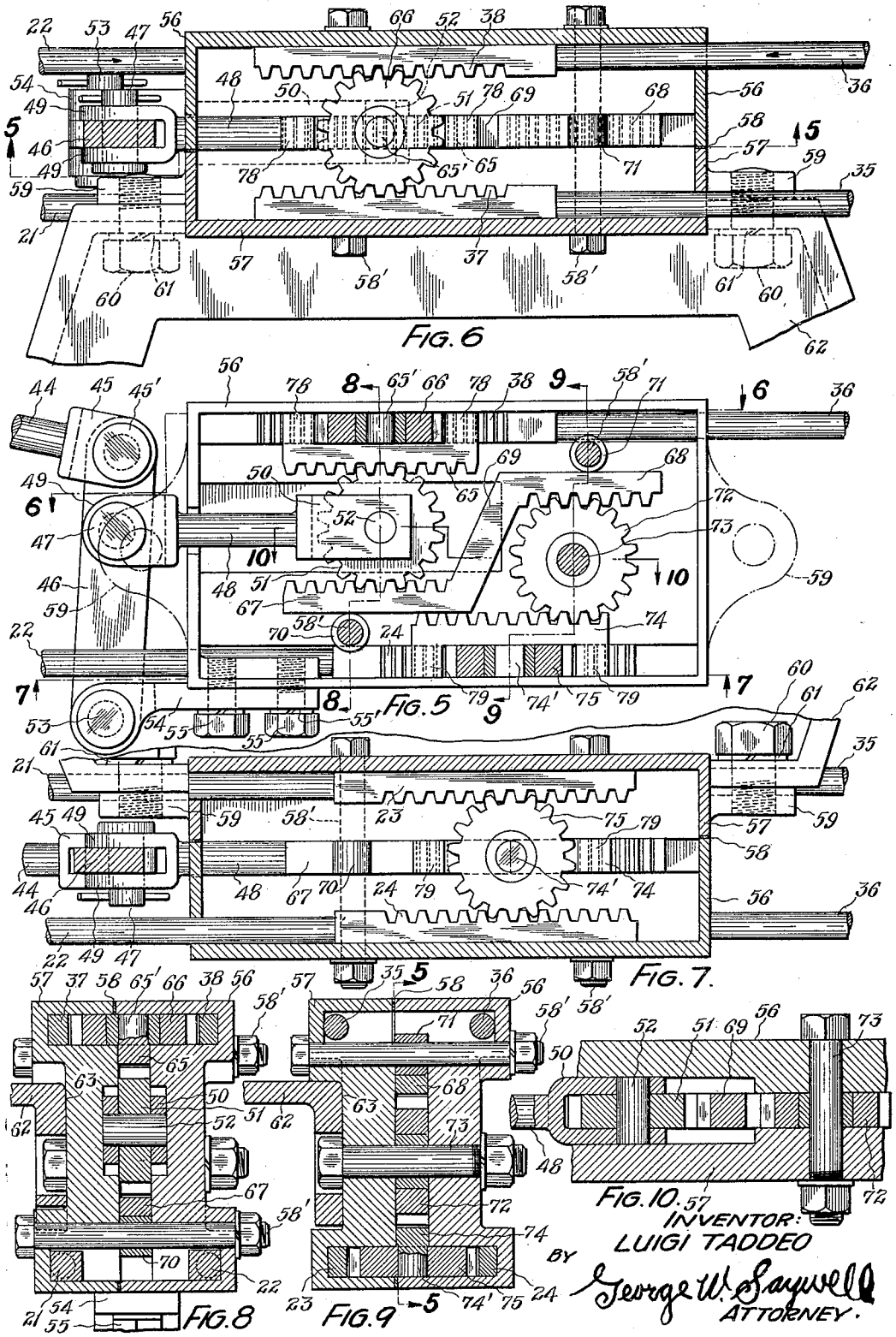

Patented May 3, 1932

1,856,670

UNITED STATES PATENT OFFICE

LUIGI TADDEO, OF CLEVELAND, OHIO

EQUALIZING DEVICE FOR BRAKES

Application filed July 30, 1929. Serial No. 382,180.

My invention particularly relates to devices of the character noted adapted to equalize the braking action applied to the four wheels of an automobile. The application presents improvements in devices of this character upon the invention shown, described and claimed in my U. S. Letters Patent No. 1,715,797, of June 4, 1929, these improvements particularly relating to means for directly rearwardly and forwardly applying the braking action to the rear wheels and front wheels, respectively, of the automobile from a housing within which is contained a floating member comprised of relatively movable parts adapted to compensate for or equalize the differential between the reactive stresses respectively exerted by the braking members working upon the four wheels, when said different braking members are worn in different amounts, or, for other reasons, react in different degrees to the same braking force. In my said patent, there are disclosed means for compensating between these various reactive stresses by means of a floating member, but the braking action is applied rearwardly upon the front wheels from a plane located materially to the rear of the housing member for the intermediate floating parts, which indirect or round-about action is obviated in the present invention by means fully shown in the accompanying drawings and hereinafter fully described. The invention also relates to other detailed improvements in mechanism of this character which will hereinafter fully appear by reference to the accompanying drawings.

The annexed drawings and the following description set forth in detail certain means illustrating my invention, such disclosed means constituting, however, but one of the various forms in which the principle of the invention may be embodied.

In said annexed drawings:

Figure 1 is a side elevation of an automobile chassis equipped with my improved four-wheel braking device;

Figure 2 is a plan of the chassis and elements shown in Figure 1;

Figure 3 is a fragmentary transverse vertical section, taken in the plane indicated by the line 3—3, Figure 2, particularly showing means for segregating the braking action upon the two front wheels, these means being simply illustrative of expedients for effecting such segregation. This view is upon an enlarged scale;

Figure 4 is a view similar to that shown in Figure 3, taken in the plane indicated by the line 4—4, Figure 2, and illustratively showing means for segregating the braking action between the two rear wheels;

Figure 5 is a fragmentary longitudinal vertical section, upon a still larger scale, taken in the plane indicated by line 5—5, Figure 2, showing the floating elements and their housing;

Figure 6 is a plan section, taken in the planes indicated by the line 6—6, Figure 5;

Figure 7 is a bottom plan section, taken in the plane indicated by the line 7—7, Figure 5;

Figure 8 is a transverse vertical section taken in the planes indicated by the line 8—8, Figure 5;

Figure 9 is a transverse vertical section taken in the planes indicated by the line 9—9, Figure 5, particularly showing a longitudinally fixed idler pinion disposed intermediate the floating elements directly attached to the front braking devices and the floating elements directly attached to the rear braking devices; and Figure 10 is a fragmentary horizontal longitudinal section, taken in the planes indicated by the line 10—10, Figure 5.

Referring to the annexed drawings in which the same parts are indicated by the same respective numbers in the different views, the four wheels of an automobile are indicated by the respective ordinals 1, 2, 3, and 4, to the front wheels 1 and 2 of which are applied braking devices through the medium of levers 5 and 6 connected, respectively, to rods 7 and 8, whose other ends are pivoted to one end of levers 9 and 10, respectively, whose opposite ends are pivoted upon the chassis frame. Intermediate the ends of the levers 9 and 10 are pivoted, respectively, one end of rods 11 and 12, whose other ends are respectively pivoted to levers 13 and 14 rigidly secured to the two parts 15 and 16, respectively, of a divided shaft whose outer ends are mounted in the chassis frame member 64 and whose inner ends are respectively supported by the two legs 17 and 17' of a U-shaped hanger dependently supported by a chassis cross frame member 18, as plainly shown in Figure 3. Secured to the shaft parts 15 and 16, respectively, are two depending levers 19 and 20 to whose lower ends are pivotally secured rods 21 and 22, respectively, that are formed at their other ends into rack members 23 and 24, respectively, the teeth of the racks being oppositely disposed and facing inwardly of floating device housing members 57 and 56, respectively, hereinafter fully described, the rear face portions of these rack members 23 and 24 being smooth, as plainly shown in Figure 7, and adapted respectively to slide upon the inner walls of the housing members 57 and 56, respectively.

Respectively acting upon braking devices applied to the rear automobile wheels 3 and 4 are a pair of levers 25 and 26 pivotally secured respectively to one end of forwardly extending rods 27 and 28 whose other and forward ends are pivotally secured, respectively, to a pair of levers 29 and 30 which are rigidly secured to the two parts 31 and 32 of a divided transverse shaft mounted in the chassis side frame member 64 at their outer ends, and whose inner ends are supported by the two outer ends of a forwardly extending bracket 76 secured to the chassis cross frame member 77. Secured to the inner ends of the respective shaft parts 31 and 32 are a pair of levers 33 and 34 to which are pivotally connected at their lower ends a pair of forwardly extended rods 35 and 36, respectively, whose forward ends are formed respectively into rack portions 37 and 38 contained within the floating device housing and adapted similarly to the afore-described rack members 23 and 24 to slide upon the inside surfaces of the housing members 57 and 56, the arrangement and disposition of the several parts being such, as plainly shown in Figures 1 and 5, that the rearward brake rods 35 and 36 lie in a plane above the forward brake rods 21 and 22. This relative arrangement also is plainly shown in Figure 5 wherein one of each pair of brake rods appears, the plane of section of this Figure 5 being shown in Figure 2, wherein it will be noted that the right-hand brake rod of each pair, with respect to the automobile operator's position, is shown in this Figure 5.

Braking action is applied through the medium of the service brake pedal 39 pivoted at 40 to the clutch housing and also pivotally secured intermediate of its ends to a clevis 41 integrally formed upon the end of a rod 42, whose other end is secured in a coupling member 43. Also secured in this coupling member 43 is the forward end of a rod 44 which is extended rearwardly and terminates in a clevis 45 intersected by a pin 45' which is mounted in a depending lever 46 whose lower end is pivoted upon a pin 53 mounted in the forward end of a bracket 54 secured at its rear end by bolts 55 and lock washers 55' to the forward part of the bottom face of the housing member 56. Intermediate its ends, the depending lever 46 is intersected by a pin 47 whose ends are mounted in the ears 49 of a clevis formed at the outer end of a rod 48 which passes through the front of the housing member 57 and is formed at its rear end into a clevis having ears 50 between which is mounted a vertically-disposed pinion 51 upon a pin 52 secured in the ears 50.

The floating device housing which has been hereinbefore referred to, is comprised of two vertically aligned dish-shaped members 56 and 57 whose vertically aligned meeting edges are jointed by a gasket member 58 and which are rigidly secured together by means of a pair of transverse bolts 58'. This housing 56—57 is mounted upon an inwardly extending bracket 62, plainly shown in Figure 2, and rigidly secured at its outer ends to the chassis side member 64, the inner longitudinal member of the said bracket 62 being adapted to seat within a recess 63 in the outer face of the housing member 57, the latter being also formed with front and rear ears 59 which are secured by means of the bolt 60 and lockwasher 61 to the inner ends of the respective legs of the bracket member 62.

Referring particularly to Figure 5, it will be noted that the pinion 51 mounted on the rear end of the service brake pedal operated devices cooperates with a rack member 65, the teeth of which are formed upon the lower portion and hence extend downwardly and inwardly of the housing 56—57. The upper part of the body member of the rack 65 is formed into a vertical pin portion 65' upon which is mounted a pinion 66 adapted to cooperate upon its oppositely disposed side portions with the two rack portions 37 and 38 which are formed upon the front end of the rear wheel brake rods 35 and 36. This arrangement affords a floating device as between the two rear wheel braking members, whereby a differential travel of the rack members 37 and 38 over the pinion 66 will compensate for a difference in the reactive stresses exerted by the braking devices attached to the rear wheels. Similarly, a differential movement as between the pair of front brake rods 21 and 22 is afforded through the medium of a pinion 75 which is mounted upon the downwardly extended pin portion 74' of the body of a rack member 74 whose teeth are formed upon its inner upper face portion and cooperate with a pinion 72 mounted upon a shaft 73 intersecting the housing members 56 and 57 and secured therein, as plainly shown in Figure 9, the transfer of motion from the pinion 51 to the pinion 72, Figure 5, being effected by a three-part member 67—68—69, of which a lower portion 67 is formed with upwardly extending rack teeth cooperating with the pinion 51, and an upper portion 68 of which is formed with downwardly extending rack teeth cooperating with the pinion 72, and the intermediate part 69 of which is a plane untoothed member connecting the two rack portions 67 and 68. The lower and upper faces, respectively, of the rack member 67 and the rack member 68 are supported and guided by rollers 70 and 71, respectively, mounted upon the connecting bolts 59 which rigidly secure together the two housing parts 56 and 57.

It is evident, first, that this arrangement provides a differential movement between the brake rods 21 and 22 accordingly as the front braking devices exert different reactive stresses to the braking action; secondly, it provides a differential movement between the brake rods 35 and 36 accordingly as the rear braking devices exert different reactive stresses to the braking action; and thirdly, that the entire arrangement through the medium of the intermediate connecting rack member 67—68—69 effects differential movements between the front pair of braking devices and the rear pair of braking devices. In other words, the floating device permits compensation as between the two pairs of braking devices and also between the two members, respectively, of both pairs of devices. It will be noted that the pinion 72 is simply an idler providing within the housing itself for directly pulling rearwardly upon the front braking devices and thus within the housing providing a reversal of the direction of application of force applied to the service brake pedal 39, insofar as the front braking devices are concerned. The body portions of the rack members 65 and 74 also slide upon the inside of the housing member 57. For this purpose, the ends of the rack members 65 and 74 are formed with upwardly extending and downwardly extending end members 78 and 79, respectively, whose upper and lower surfaces, respectively, slide upon the inner, upper and lower respective faces of the housing member 56.

What I claim is:

1. An equalizing brake device for four-wheel brakes comprising, means for applying braking action; a plurality of independent braking members, one for each of two front wheels and one for each of two rear wheels; a housing adaptable for support upon a chassis; and means contained within said housing for equalizing the differential between the reactive stresses of said braking members including independently movable racks secured to said members respectively, a pair of floating transmission members, one of which engages the pair of racks secured to the front braking members and the other of which engages the pair of racks secured to the rear braking members, said transmission members being adapted to ride upon said racks, an idler gear fixed in the direction of movement of said transmission members, said gear engaging one of said floating transmission members, a pinion mounted upon said brake-applying means, and other floating transmission means connected to and intermediate of said pinion and said idler gear, the arrangement being such as to cause said pinion and said idler to travel in opposite directions when said brake-applying means are operated.

2. An equalizing brake device for four-wheel brakes comprising, means for applying braking action; a plurality of independent braking members, one for each of two front wheels and one for each of two rear wheels; and means for equalizing the differential between the reactive stresses of said braking members including independently movable racks secured to said members respectively, a pair of floating transmission members, one of which engages the pair of racks secured to the front braking members and the other of which engages the pair of racks secured to the rear braking members, said transmission members being adapted to ride upon said racks, an idler gear fixed in the direction of movement of said transmission members, said gear engaging one of said floating transmission members, a pinion mounted upon said brake-applying means, and a floating angular bar member having a rack portion engaging one side of said pinion and a second rack portion engaging the opposite side of said idler.

3. A floating equalizing brake unit comprising, a housing; a movable rod extended through one end thereof and having a pinion mounted in one end; a pair of rack members freely slidable in said housing and one of which engages said pinion; pinions mounted in said rack members, respectively; two pairs of other rack members freely slidable in said housing and respectively engaging the opposite sides of said last-mentioned pinions, one of said pairs of rack members being extended outwardly through the same end of said housing as said rod, the other pair of rack members being extended outwardly through the opposite end of said housing; an idler pinion mounted in said housing and fixed in the direction of travel of said first-mentioned pair of rack members; and a three-part transmission element consisting of lower and upper end rack sections respectively engaging the bottom of said first-mentioned pinion and the top of said idler pinion and a unitary intermediate inclined connecting section, said idler pinion engaging the other of said first-mentioned pair of rack members.

4. A floating equalizing brake unit comprising, a housing; a service brake rod extended through one end of and into said housing; a pinion mounted upon a horizontal axis and within said housing; a pair of rack members freely slidable in said housing and one of which engages said pinion; pinions mounted upon vertical axes in said rack members, respectively; two pairs of other rack members freely slidable in said housing and respectively engaging the opposite sides of said last-mentioned pinions, one of said pairs of rack members being extended outwardly through the same end of said housing as said rod, the other pair of rack members being extended outwardly through the opposite end of said housing; an idler pinion mounted upon a horizontal axis in said housing and fixed in the direction of travel of said first-mentioned pair of rack members; and a three part transmission element consisting of lower and upper end rack sections respectively engaging the bottom of said first-mentioned pinion and the top of said idler pinion and a unitary intermediate inclined connecting section, said idler pinion engaging the other of said first-mentioned pair of rack members.

Signed by me this 25th day of July, 1929.

LUIGI TADDEO.